United States Patent [19]

Ainger et al.

[11] 4,292,338
[45] Sep. 29, 1981

[54] PROCESS FOR PRODUCING CONFECTIONERS' BUTTER

[75] Inventors: George E. Ainger, Wareham; Brian L. Caverly, Neopham, both of England

[73] Assignee: Lever Brothers Company, New York, N.Y.

[21] Appl. No.: 75,342

[22] Filed: Sep. 13, 1979

Related U.S. Application Data

[60] Division of Ser. No. 848,675, Nov. 4, 1977, Pat. No. 4,214,012, which is a continuation of Ser. No. 393,865, Sep. 4, 1973, abandoned, which is a continuation of Ser. No. 210,550, Dec. 21, 1971, abandoned.

[30] Foreign Application Priority Data

Jan. 6, 1971 [GB] United Kingdom .................. 714/71

[51] Int. Cl.³ .............................................. A23D 3/02
[52] U.S. Cl. ..................................... 426/603; 426/607
[58] Field of Search ........................... 426/607, 603; 260/410.7

[56] References Cited

U.S. PATENT DOCUMENTS

| | | | |
|---|---|---|---|
| 2,667,418 | 1/1954 | Barsky | 426/601 |
| 2,726,158 | 12/1955 | Cochran | 426/607 |
| 2,783,151 | 2/1957 | Cochran | 426/313 |
| 3,396,037 | 8/1968 | Bell | 426/6 07 |

*Primary Examiner*—Hiram Bernstein
*Attorney, Agent, or Firm*—James J. Farrell; Melvin H. Kurtz; Irving N. Feit

[57] ABSTRACT

The specification describes a fat composition which is suitable for use as confectioners' butter, particularly for biscuit cream fillings. The composition consists essentially of a random distribution of combined $C_{10}$–$C_{18}$ fatty acids with a maximum stearic acid content and a specified iodine value range.

1 Claim, No Drawings

PROCESS FOR PRODUCING CONFECTIONERS' BUTTER

This application is a divisional application of Ser. No. 848,675 filed Nov. 4, 1977 and now issued as U.S. Pat. No. 4,214,012 which is a continuation of Ser. No. 393,865 filed Sept. 4, 1973 and now abandoned which in turn is a continuation of application Ser. No. 210,550 filed Dec. 21, 1971 and now abandoned.

BACKGROUND OF THE INVENTION

1. Field of the Invention

This invention relates to fat compositions which are particularly suitable for use as confectioners' butters and which are characterised by a randomised combined fatty acid composition conforming to specific requirements set out in more detail hereinafter.

The principal components of natural oils and fats are glycerides the fatty acids of which in combined form are found with different chain lengths and degrees of unsaturation. Different fatty acids may be found in the same glyceride molecule and in most natural fats a wide variety of glycerides is commonly found.

The nature of the fatty acids found in a fat and their distribution in the glycerides of which it is composed influences its melting characteristics and hence largely determines its suitability for edible purposes, in food products based essentially on fat compositions.

The melting requirements of a fat composition and therefore the nature of the fatty acids it contains vary according to the nature of the food product it is intended for and attempts to meet these requirements are based upon a judicious selection of fats, several of which may be blended to meet a particular purpose and by the further manipulation of its fatty acid content through fractionation and other, more sophisticated techniques the purpose of which is to concentrate those glycerides which are desired at the expense of those which are regarded as less desirable.

Although the melting characteristics of a fatty acid correspondingly affects those of a glyceride in which it is combined, with the result that a high melting fatty acid can form a high melting glyceride, the relationship is complicated in natural fats by the presence of a variety of fatty acids in several glyceride species and, combined within each glyceride molecule the possibility of more than one fatty acid. The melting point of fatty acid itself is influenced chiefly by its chain length and degree of unsaturation, naturally occurring unsaturated fatty acids being liquid at ambient temperatures, although it will be apparent that glycerides in which they occur may nevertheless be solid, owing to the greater influence of saturated, long chain fatty acids within the same glyceride molecule.

Although therefore some separation of combined fatty acids is effected by fractional crystallisation of fats, it is incomplete because high and low melting fatty acids may be combined within the same glyceride molecule.

The melting behaviour of a fat composition may also be modified by redistributing its fatty acids among the glyceride molecules of the fat. The overall fatty acid composition remains unchanged but the redistribution, which may be on a random or statistical basis throughout the glyceride molecules, substantially modifies the melting behaviour of the composition. Techniques have been developed in which the interesterification is constrained to favour the continued formation of a specified glyceride by continuously withdrawing it from the reaction, for example by fractional crystallisation. Reference may be made for further details of these techniques to Bailey's Industrial Oil and Fat Products, 3rd Edition (Interscience 1964). It is not within the ambit of this specification to apply for protection of these fat manipulation techniques in themselves. The invention is concerned with the particular field of confectionery fats which are also known as confectioners' butters or hard butters. These have a wide variety of uses, being applied for example as candy couvertures or as biscuit fillings, the fat usually being blended for such purposes with flavouring substances and sugar.

The melting requirements for confectioners' butters are apt to differ somewhat from those which are accepted for fats intended for use in chocolate compositions. For the specialised requirements of hard butters lauric fats are particularly prized. These include coconut oil, palm kernel oil and babassu oils, although there are many others. This class of vegetable fats is so-called on account of their high content of lauric acid, usually in association with myristic acid, which are largely responsible for the desirable melting characteristics for which these fats are preferred.

Lauric fats are however expensive, and attempts have been made to incorporate other, less expensive fats, without rendering the resulting composition unacceptable for hard butter purposes. From the foregoing account however it will be apparent that the parameters governing the extent to which cheaper fats may be incorporated cannot be rationalised for practical purposes in terms of fatty acid composition alone and the art remains one of matching melting requirements with empirical recipes of natural, if modified fats.

2. The Prior Art

The use of interesterification as a method of modifying the melting behaviour of edible fats including lauric fats has been widely disclosed and may be exemplified by reference to U.S. Pat. Nos. 2,442,531 and 2,442,532 (Eckey). In British Pat. No. 955,788 (Canadian Packers) a confectionery coating fat is disclosed consisting essentially of hydrogenated palm kernel oil, part of which only is randomised. The preparation of hard butters based on mixed lauric and non-lauric fats is exemplified in British Pat. No. 1,102,944 (Nestle) in which a blend of short and long chain glycerides is disclosed as a chocolate fat melting at 22°–35° C. and having an iodine value falling within the range 30–35. The latter requirement is a measure of the extent of unsaturation and hence of the complement of unsaturated fatty acids, which contribute to the softness of the product and together with the kinds of fat components used to provide the long chain glycerides, renders the product less suitable for certain purposes as a confectionery fat.

The iodine values which may be calculated from the fat compositions disclosed in British Pat. No. 1,107,207 (National Biscuit Co.) all fall within a range which is too low for the purposes of defining the most suitable confectionery fat. This Patent describes fat compositions prepared by co-randomisation of a saturated fat with a major proportion of a half-hydrogenated lauric fat.

A wide range of hard butter compositions is disclosed in U.S. Pat. No. 2,726,158 (Glidden) in which a fat formulation is described including rearranged blends of lauric and non-lauric fats which are then hydrogenated and conform to specified iodine value and fatty acid chain length ranges. All the Examples with which the disclosure is specifically exemplified however are based on fat compositions whose stearic content and iodine values are too high to afford the most suitable fat blends for confectioners' butter. Similarly the fat compositions disclosed in U.S. Pat. No. 2,936,238 (Weiss) are based on co-randomized lauric and non-lauric fats that all show an iodine value which is too low and/or a stearic acid content which is too high for best results. Again in U.S. Pat. No. 3,085,882 (Gooding et al) a fully hardened fat contributes, with the palm kernel oil with which it is co-randomised, a stearic acid content that is probably too high in all possible proportions of the components in the product, the iodine value of which is in any event too low for best results in confectioners' fats.

U.S. Pat. No. 3,396,037 (Bell et al) discloses a rearranged fat for use as a hard butter which is characterised by a rapid setting time and is based on a randomised lauric fat optionally hydrogenated and blended with a non-lauric fat or other fatty acid ester intended to supplement for example the stearic acid content of the fat. As with the preceding disclosures however, the Patent fails to emphasise the selection of compositions represented by the stearic acid content and degree of unsaturation which must be met to give the most suitable fat composition for confectioners' butter.

This invention relates to edible fat compositions, more particularly of the kind known as confectioners' butters.

Confectioners' butters are used in fillings for biscuits, candies and chocolate bars. They find widespread use also in cake fillings.

Lauric fats, chiefly coconut, palm kernel, babassu and tucum oils are themselves a valuable source of confectioners' butters, providing in a substantial measure, often after fractionation and/or hardening, the requirements for these products, chiefly sharp melting characteristics over a narrow temperature interval and range from products which are crisp and easily snapped to others which while firm at 20° C. are yet moderately soft to the tooth on biting. They change to a wholly-melted, thin liquid at about 35° C. or slightly above, in the region of body temperature. Their composition chiefly comprises lauric glycerides with varying amounts of other combined fatty acids, particularly myristic acid.

The present invention provides confectioners' butter having iodine value of from 10–25, and the fatty acid composition in random distribution of a blend of a non-lauric fat with a lauric fat, the said composition comprising at least 88 wt % $C_{10}$–$C_{18}$ fatty acids including not more than 25 wt % stearic acid. Preferably the stearic acid content is less than 15 wt %. Blends are further preferred which have iodine values of at least 12.

Preferably also the non-lauric fat is steeply-melting and has an iodine value of less than about 20 and a slip melting point of at least 20° C., but particularly at least 35° C. and more especially at least 45° C.

By a steep melting non-lauric fat is meant one having a dilatation drop of at least 500, preferably at least 700 and more particularly 1000, within 10° C. and preferably within 5° C. of the slip melting point of the fat.

The invention includes compositions based on lauric and non-lauric fat fractions, whether obtained by dry fractionation, solvent fractionation or fractionation techniques in which aqueous surfactant solutions are used, in addition to the whole fats. Moreover, the non-lauric fat may be a hydrogenated fat, whether partly or fully hydrogenated, or a stearine thereof.

For the lauric fat component, palm kernel oil is particularly suitable, although babassu, coconut or tucum oil may for example also be used, preferably after removal of a stearine fraction which may itself be a suitable source of confectioners' butter. The invention thus enables increased yields of confectioners' butter to be provided from a lauric fat, by utilising an oleine fraction in addition to the conventional stearine fraction.

A wide range of fats is suitable for providing the non-lauric component of the interesterified blend according to the present invention. Preferably the non-lauric component comprises a $C_{16}$/$C_{18}$ vegetable oil, a very suitable source being palm oil. Others include for example oleines from sal fat. The specified requirements for the product, particularly as to iodine value and stearic acid content, must however be met and to this end it may be necessary to modify the fat selected for the non-lauric fat, for example by hydrogenation and fractionation.

The extent to which the lauric or non-lauric components of the interesterified blends according to the invention are first fractionated or the non-lauric component hydrogenated, if at all, may be varied in accordance with the particular requirements for the product, subject to meeting the above-stated characteristics. However, confectioners' butters are characterised by a sharp melting range somewhat below body temperature, reflected in a drop of dilatation values of at least 500, more preferably at least 700 over the last 10° C. below the slip melting point, which should be between 28° and 40° C., preferably between 30° and 37° C. and especially 30°–35° C. Any fractionation and hydrogenation of the components for the interesterified product should therefore be carried out with this end in view. Where the confectioners' butter is intended for use in biscuit creams the $D_{20}$ should be below 1500 and preferably below 1100, but preferably at least 900, while its $D_{30}$ should be about 300.

A suitable palm oil fraction is provided by the higher melting residue obtained by solvent fractionation of palm oil to obtain a mid-fraction suitable for use as a cocoa butter extender. The mid-fraction obtained under these circumstances has an iodine value of from 25–40, and the stearine fraction has an iodine value of about 5–20, preferably 8–15, and a slip melting point of 50° C. or more, according to the source of the palm oil and the extent to which it is fractionated to obtain the mid-fraction. Other fractionation techniques may however be used, if necessary in conjunction with hydrogenation, to yield a fraction preferably having a slip melting point of at least 45° C. and more preferably at least 50° C. and an iodine value of at most 20, preferably 2–15, for the non-lauric component of the invention. It is usually necessary to hydrogenate dry fractionated palm stearine to achieve a $D_{20}$ of at least 500 in the interesterified product.

A suitable source of a palm kernel fraction as the lauric component is the oleine residue remaining after removal of a stearine fraction for confectioners' butter from palm kernel oil, whether by dry, solvent or other fractionation. The oleine fraction thus obtained generally has an iodine value of from 15 to 25.

The proportion of the lauric and non-lauric components of the products of the invention may be varied between wide limits. Preferably however the lauric:-non-lauric weight ratio is less than about 5:1, and more preferably the lauric component is the major component in a ratio up to 4:1, especially up to 3:1, to allow the quick melting characteristics of the lauric fat to persist in the blend. The setting point is preferably between 25° and 30° C., preferably about 27.5° C.

The interesterification is carried out in a conventional manner, the fat blend being melted and the reaction carried out in the presence of an effective amount of an interesterification catalyst. This is preferably a hydroxide or lower alkoxide of an alkali metal, preferably sodium, or the alkali metal itself. Sodium methoxide, sodium hydroxide and sodium metal are particularly preferred. Reference may be made for the purpose of carrying out the interesterification to our co-pending British patent application No. 33362/68, U.S. Pat. No. 3,852,315. The process may be carried out at temperatures between 15° and 150° C., provided the fat blend is liquid. Preferably however the interesterification is carried out within the range from 50°–100° C., for example 70° C. At such temperatures the reaction is usually completed within an hour. The amount of catalyst used is preferably between 0.01 and 5% by weight, preferably between 0.1 and 1%, for example 0.5%.

Small amounts of additional fat components may be included before or after interesterification, provided these do not markedly influence the sharp melting characteristics of the interesterified blend.

Deodorisation markedly improves the eating qualities of the interesterified blend, but is also useful in removing any volatile components formed during the interesterification, e.g. methyl esters formed by reactions in which sodium methoxide was the catalyst. The presence of such volatile components may lower the dilatation results slightly. The physical properties of an undeodorised product should therefore be used with some caution, as it is those of the fully refined and deodorised product which relate to its performance in an edible composition, and to which therefore reference is made in the text, except where otherwise stated.

In the preparation of biscuit filling creams, coatings and the like, the fat compositions of the invention are usually blended with a suitable sweetening agent, preferably icing sugar, in an amount preferably from 2:3 to 3:2 parts by weight. Other additives or bulking agents may be added to reduce the fat content, e.g. milk powder and whey powder, in addition to flavouring agents, e.g. vanillin, or defatted cocoa powder.

Dilatation values of the non-lauric fat component of the invention may be measured in accordance with the method described in our British Pat. No. 855,349. Where difficulty is experienced in applying this method, for example to very hard palm oil fractions or other very hard fats whose crystallisation and expansion characteristics may lead to the formation of vacuoles and gas bubbles which invalidate the experiment, or even crack the glass where used, alternative methods for determining the solids content at specified temperatures are known, including nuclear magnetic resonance, differential thermal analysis and differential scanning calorimetry.

Iodine values referred to in the text are measured according to Wijs' No. 1 method described in British Standard Specification 684/1958 on page 74 and slip melting points as described on page 14 of the same reference.

It will be clear to those practised in the art, that where a small reduction in the iodine value of the mixture is desired to satisfy the demands of the final application, this may be achieved by hydrogenating the lauric component, the non-lauric component, or both, or by hydrogenating the blend either before or after interesterification, provided that in each case the final iodine value is within the required range. In general however, where hydrogenation is an expensive process it will be most economic to hydrogenate one of the components, for instance the non-lauric component, instead of the blend. On the other hand, where the colour, taste and shelf-life of the final product are of great importance, it may be of advantage to carry out the hydrogenation after the interesterification.

EXAMPLE 1

75 Parts by weight of an oleine fraction remaining after fractionation of palm kernel oil using an aqueous solution of surfactant to recover a stearine of iodine value 8 for the manufacture of confectioners' butter, was interesterified with 25 parts by weight of a stearine recovered after acetone fractionation of palm oil to obtain a palm mid-fraction for use in cocoa butter substitutes. The slip melting point of the palm stearine was 58° C., its dilatation at 35° C. about 1500 and at 60° C. nil. The interesterification was carried out at 105° C. using 0.2% by weight of sodium methoxide, the blend being stirred throughout the interesterification and for an hour afterwards, during which time the blend was permitted to cool to 50° C. The interesterified mixture was then washed several times with water at 40° C. to extract the catalyst, and deodorised at about 175° C. and 4 mm Hg pressure with steam admitted under the fat surface.

EXAMPLE 2

A similar product was prepared in the same manner, using the same lauric and non-lauric fat components in the interesterification but in the proportions 70:30 parts by weight.

The characteristics of the interesterified blends of both Examples appear in Table I.

TABLE I

| | Fatty Acid | Palm Kernel Oleine | Palm Stearine | Examples 1 | Examples 2 |
| --- | --- | --- | --- | --- | --- |
| Saturated | $C_6$–$C_8$ | 4.8 | — | 3.7 | 3.4 |
| | $C_{10}$ | 4.1 | — | 3.1 | 2.9 |
| | $C_{12}$ | 4.5 | — | 33.6 | 31.5 |
| | $C_{14}$ | 12.5 | 1.6 | 9.8 | 9.3 |
| | $C_{16}$ | 8.6 | 81.1 | 26.8 | 30.5 |
| | $C_{18}$ | 2.9 | 6.0 | 3.7 | 3.8 |
| Monounsat. | $C_{18}$ | 19.7 | 10.4 | 17.4 | 16.9 |
| Di-unsat. | | 2.3 | 0.9 | 1.9 | 1.9 |
| Iodine value | | 21 | 10 | 18 | 17.4 |
| Slip M.Pt. °C. | | — | 58 | 32 | 34.5 |
| $D_{20}$ | | | | 970 | 1110 |
| $D_{30}$ | | | | 275 | 405 |
| $D_{35}$ | | | | 20 | 205 |
| $D_{40}$ | | | | 15 | 15 |
| $D_{45}$ | | | | Nil | Nil |

Biscuit filling creams were prepared from each of the interesterified blends after deodorisation by mixing 40% of the blend with 60% icing sugar and 0.1% vanillin flavouring, by weight. A tasting panel consisting of 6 experts pronounced the products to be excellent and the second, containing 70% lauric fat, to be especially suitable for a summer grade filling cream, being particularly easy to stencil and with good adhesion to biscuits.

The interesterified blend of Example 2 was further examined as follows:

| | |
|---|---|
| Initial Peroxide Value | 0.6 m.eq./Kg. |
| Accelerated Induction Period (Sylvester test) | $\frac{128 \text{ mm at 20 hours}}{7 \text{ hours to 20 mm.}}$ |
| Taste | Good |
| Levibond colour in 5¼ inch cell | 1.6 Red 10.0 Yellow |
| Free fatty acid | 0.02% (as lauric) |

These results demonstrate the excellent quality of the product.

EXAMPLE 3

75 Parts of the palm kernel oleine described in Example 1 were interesterified as described in that Example, but with 25 parts of a steeply-melting hydrogenated palm oil stearine. The stearine was obtained in 28% yield by cooling palm oil quickly from 80° C. to 27°–28° C., agitating for 1 hour at that temperature and filtering. Before interesterification the iodine value of the stearine was decreased from 47.2 to 2.2 and its slip melting point increased to 57.1° C. by hydrogenation at 180° C. and 20 psig using 0.5 wt % nickel-on-kieselguhr catalyst containing 17 wt % nickel. The combined acid analyses of the stearine before and after hydrogenation was as follows, expressed as wt %:

myristic 1.9; palmitic 51.4; stearic 6.1/44.1; oleic 33.0/2.6; linoleic 7.6/nil.

The interesterified product analysis was as follows:

| | Slip M.Pt. | Dilatation | | | Combined acids wt % | |
|---|---|---|---|---|---|---|
| I.V. | °C. | 20° C. | 30° C. | 35° C. | $C_{10}$–$C_{18}$ | Stearic |
| 15.4 | 34.1/33.5* | 1090/1120* | 345/365* | 50/50* | 96.3 | 13.1 |

*After deodorisation

After deodorisation this interesterified product changed only slightly in composition and was also found to provide satisfactory biscuit fillings. It had a good taste and a peroxide value of zero, indicating good keeping and flavour stability properties.

EXAMPLE 4

A satisfactory confectioners' butter was obtained by interesterification, as described in Example 1, of a blend of 75% palm kernel oleine and 25% palm stearine of iodine values 21.0 and 10.2, both obtained by acetone fractionation. The product analysis was as follows:

| | Slip M.Pt. | Dilatation | | | | | Combined acids wt % | |
|---|---|---|---|---|---|---|---|---|
| I.V. | °C. | 20° C. | 25° C. | 30° C. | 32.5° C. | 35° C. | $C_{10}$–$C_{18}$ | Stearic |
| 18 | 31.4 | 820 | 495 | 200 | 90 | 0 | 96.4 | 3.7 |

EXAMPLE 5

80 Parts of palm kernel oleine of iodine value 24.3 and 20 parts of palm stearine of iodine value 8.7, both obtained by acetone fractionation, were interesterified as described in Example 1.

The catalyst was removed and the interesterified fat product deodorised and found to be satisfactory for use in biscuit fillings.

The fat product analysis was as follows:

| | Slip M.Pt. | Dilatation | | | | Combined acids wt % | |
|---|---|---|---|---|---|---|---|
| I.V. | °C. | 20° C. | 25° C. | 30° C. | 35° C. | $C_{10}$–$C_{18}$ | Stearic |
| 21.0 | 30.4 | 710 | 360 | 120 | 0 | 96.2 | 3.5 |

EXAMPLE 6

Palm stearine, obtained by dry fractionation and hydrogenated as described in Example 3, except that the hydrogenation was discontinued at about I.V. 30, was randomly interesterified at 110° C. with equal parts by weight of palm kernel oleine of iodine value 20 and coconut oil of iodine value 8.8, using 0.25 wt % sodium methoxide as catalyst. The catalyst was inactivated with water and the fat deodorised.

The deodorised product was evaluated as a confectionery fat by blending with 1½ times its weight of icing sugar to make a biscuit filling cream, which was found to be comparable in appearance with a standard commercial product and superior in flavour, as judged by a taste panel.

Particulars of the fats appear in Table II.

TABLE II

| | Palm Stearine | | |
|---|---|---|---|
| | Before hydrogenation | After hydrogenation | Interesterified Blend |
| Iodine value | 41.9 | 30.2 | 19.6 |
| Slip M.Pt. ° C. | 48.0 | 49.5 | 32.3 |
| Dilatations | | | |
| $D_{20}$ | 1200 | 1925 | 965 |
| $D_{25}$ | 1090 | — | 600 |
| $D_{30}$ | 965 | 1770 | 270 |
| $D_{35}$ | 898 | 1565 | 25 |
| $D_{40}$ | 750 | 1290 | 15 |
| $D_{45}$ | 565 | 835 | 0 |
| $D_{50}$ | 300 | 185 | 0 |
| $D_{55}$ | 0 | 5 | 0 |
| Combined fatty acids | | | |
| $C_{10}$–$C_{18}$ wt % | | | 92.3 |
| Stearic wt % | | | 4.8 |

EXAMPLE 7

A blend containing 65% coconut oil (CN) and 35% dry fractionated palm stearine (PS) of iodine value 42 was interesterified at 115° C. using 0.25% of sodium methoxide catalyst. The washed and dried material was then hydrogenated with 0.25% nickel catalyst at 180° C. for 15 minutes to give a product of iodine value 14.6.

After deodorisation the interesterified and hardened blend was found superior to the standard commercial product with respect to colour, taste and shelf-life. It was evaluated as a biscuit cream filling in a blend of 60% icing sugar, 40% fat and gave an exceptionally white and fluffy mix. It also gave a smooth melt-down with no after-taste. Taste panel assessment was very favourable, the experimental blend being preferred to a control based on a standard commercial product.

The characteristics of the product, together with those of the components, are shown in Table III.

TABLE III

| Fat | I.V. | Slip M.Pt. °C. | Dilatation | | | | | | | Combined acids wt % | |
|---|---|---|---|---|---|---|---|---|---|---|---|
| | | | 20° C. | 25° C. | 30° C. | 35° C. | 40° C. | 45° C. | 50° C. | $C_{10}$-$C_{18}$ | Stearic |
| PS | 41.9 | 48.0 | 1200 | 1090 | 965 | 890 | 750 | 545 | 300 | | |
| C.M. | 8.1 | — | — | — | — | — | — | — | — | | |
| Interesterified blend of 35% PS 65% CHO | 19.6 | 31.1 | 775 | 480 | 165 | 15 | 0 | — | — | | |
| Above blend hydrogenated | 14.6 | 32.6 | 1050 | 695 | 300 | 25 | 15 | 0 | — | 94.3 | 6.2 |

EXAMPLE 8

An oleine obtained by acetone fractionation from sal fat was substantially fully hydrogenated and interesterified with three times its weight of acetone-fractionated palm kernel oleine. After deactivating and removing the interesterification catalyst (sodium methoxide) by repeated water washing, the interesterified fat blend was deodorised and was found to be satisfactory as a confectioners' butter when blended with icing sugar in the usual proportions to provide a biscuit filling cream. Further particulars appear in Table IV.

TABLE IV

| Fatty Acid | | Palm Kernel Oleine Wt % | Sal Oleine Wt % | Hardened Sal Oleine Wt % | Interesterified Blend Wt % |
|---|---|---|---|---|---|
| Saturated | $C_6$ | 0.2 | | | 0.1 |
| | $C_8$ | 4.6 | | | 3.4 |
| | $C_{10}$ | 4.1 | | | 3.1 |
| | $C_{12}$ | 45.0 | 0.4 | 0.4 | 32.8 |
| | $C_{14}$ | 12.5 | — | — | 9.4 |
| | $C_{16}$ | 8.6 | 7.6 | 7.6 | 8.3 |
| | $C_{18}$ | 2.9 | 32.7 | 86.8 | 32.9 |
| | $C_{20}$ | — | 2.7 | 2.7 | 0.7 |
| Monounsat. | | 19.7 | 52.3 | 2.5 | 15.4 |
| Di-unsat. | $C_{18}$ | 2.3 | 4.3 | — | 1.8 |
| Tri-unsat. | | — | — | — | — |
| Iodine value | | 20.9 | 52.5 | 2.2 | 16.4 |
| Slip M.Pt. °C. | | | ca 20 | ca 60 | 31.0 |
| $D_{20}$ | | | | | 650 |
| $D_{30}$ | | | | | 155 |
| $D_{35}$ | | | | | 25 |
| $D_{40}$ | | | | | 10 |
| $D_{45}$ | | | | | — |

EXAMPLES 9-14

Particulars of further Examples carried out in accordance with the invention by interesterifying blends of partly hardened and fully hardened palm oil, all steeply-melting, with palm kernel oil and palm kernel oleine, appear in Table V. Experimental details were substantially as described in the preceding Examples.

TABLE V

| Example | Composition parts by weight | | | | | Properties | | | | | | | Combined acids wt % | |
|---|---|---|---|---|---|---|---|---|---|---|---|---|---|---|
| | PKO | PK | PTS | PHP | FHP | Dilatation Slip M.Pt. °C. | 20° C. | 25° C. | 30° C. | 35° C. | 40° C. | I.V. | $C_{10}$-$C_{18}$ | Stearic |
| 9 | | 3 | 1 | | | 33.4 | 1250 | 920 | 420 | 75 | 25 | 14.9 | 96.3 | 3.9 |
| 10 | 3 | 3 | 3 | | | 35.9 | 1070 | 710 | 345 | 130 | 10 | 16.6 | 96.1 | 3.0 |
| 11 | | 3 | | | 1 | 35.4 | 1335 | 1005 | 565 | 140 | 25 | 12.6 | 93.2 | 15.7 |
| 12 | 3 | | | | 1 | 34.6 | 1125 | 810 | 415 | 90 | 25 | 16.0 | 93.9 | 15.5 |
| 13 | | 3 | | 1 | | 32.3 | 1165 | 760 | 325 | 25 | 15 | 17.4 | 96.2 | 10.0 |
| 14 | 3 | | | 1 | | 31.2 | 955 | 610 | 220 | 20 | 15 | 20.8 | 92.9 | 9.8 |

PHP = Partly hardened palm oil I.V. 20.5 Slip melting point 54.4° C.
FHP = Fully hardened palm oil I.V. 1.1 Slip melting point 80.3° C.
PKO = Palm kernel oleins
PK = Whole palm kernel oil
PTS = Solvent-fractionated palm stearine I.V.

All the fat products obtained in these Examples were found to yield satisfactory biscuit filling creams when blended in the usual proportions with icing sugar.

EXAMPLE 15

The effect of the iodine value on the properties of the interesterified fat blends of the invention is demonstrated by this Example, in which equal parts by weight of coconut oil and dry fractionated palm stearine were interesterified at 115° C. in the presence of 0.25 wt % sodium methoxide. After washing and drying several samples of the product were hydrogenated to successive stages using 0.25 wt % supported nickel catalyst at 180° C. The hydrogenated fats were recovered and their dilatations and other characteristics determined, as appears in Table VI.

The progressive increase both in slip melting point and the $D_{20}$ and $D_{30}$ values with iodine values will be seen to make the more highly hydrogenated products of this Example less desirable for use in biscuit creams than those with less hydrogenation. All the fats display dilatations at 35° C. and above which are too high for best results, but all can be used for other purposes as confectionery fats.

TABLE VI

| Sample | I.V. | Slip M.Pt. °C. | Dilatation | | | | | | |
|---|---|---|---|---|---|---|---|---|---|
| | | | 20° C. | 25° C. | 30° C. | 35° C. | 40° C. | 45° C. | 50° C. |
| Palm stearine (PS) | 4.19 | 48.0 | 1200 | 1090 | 965 | 890 | 750 | 565 | 300 |
| Coconut oil (CN) | 8.3 | — | — | — | — | — | — | — | — |
| Interesterified CN + PS | 24.9 | 33.8 | 860 | 595 | 310 | 100 | 20 | — | — |

TABLE VI-continued

| Sample | I.V. | Slip M.Pt. °C. | Dilatation 20° C. | 25° C. | 30° C. | 35° C. | 40° C. | 45° C. | 50° C. |
|---|---|---|---|---|---|---|---|---|---|
| Hydrogenated samples | | | | | | | | | |
| 1 | 20.3 | 35.2 | 1040 | 755 | 430 | 135 | 10 | — | — |
| 2 | 18.7 | 36.1 | | | | | | | |
| 3 | 17.1 | 36.8 | 1260 | 970 | 600 | 340 | 20 | — | — |
| 4 | 15.5 | 37.4 | 1355 | 1070 | 695 | 310 | 20 | — | — |
| 5 | 13.2 | 36.5 | 1475 | 1210 | 830 | 425 | 60 | 15 | — |
| 6 | 10.9 | 39.3 | 1595 | 1350 | 960 | 510 | 110 | 10 | — |
| 7 | 8.3 | 40.7 | 1665 | 1455 | 1095 | 655 | 200 | 25 | — |

EXAMPLE 16

Each of several samples of tripalmitin, prepared by esterification of palmitic acid with glycerol, was interesterified with four times its weight of neutral palm kernel oil. The product was found to be suitable for fats in biscuit creams and had an iodine value 13.6. Its stearic acid content was 2% and its dilatation values were as follows: $D_{15}$ 1130, $D_{20}$ 920, $D_{25}$ 660, $D_{30}$ 260, $D_{35}$ 0.

The fat product was found to provide excellent biscuit creams.

What is claimed is:

1. A process of producing confectioners' butter comprising co-randomising a lauric component with a non-lauric component to produce an ester interchanged co-randomized fat having an iodine value from 10-25, a slip melting point of between 28° and 40° C., a dilatation drop of at least 500 over the last 10° C. below the slip melting point and having a fatty acid composition in random distribution of a blend consisting essentially of at least 88 weight percent $C_{10}$-$C_{18}$ fatty acids including at most 15 weight percent stearic acid of from 80-50 weight percent lauric and 20-50 weight percent edible non-lauric fats wherein the sum of the palmitic and stearic acid content of said composition is 45 weight percent.

* * * * *